April 23, 1968     L. S. GREER     3,379,406

DIAPHRAGM VALVE WITH WATER HAMMER PREVENTER

Filed March 24, 1965

INVENTOR.
LEONARD S. GREER
BY
Charles L. Lowercheck
attorney

United States Patent Office 3,379,406
Patented Apr. 23, 1968

3,379,406
DIAPHRAGM VALVE WITH WATER
HAMMER PREVENTER
Leonard S. Greer, Erie, Pa., assignor to Hays
Manufacturing Company, Erie, Pa., a corporation of Pennsylvania
Filed Mar. 24, 1965, Ser. No. 442,456
1 Claim. (Cl. 251—45)

ABSTRACT OF THE DISCLOSURE

The present invention incorporates a diaphragm pilot controlled valve, which may be solenoid operated. The diaphragm has a relatively thick seating member, wedge-shaped in cross section, attached to its center and this seating member engages first one side and then the other of the orifice through the valve. Thus, a smoother shut-off of the valve is provided and no impact of the valve results when the valve closes, even under high pressure.

This invention relates to valves and, more praticularly, to valves having means thereon to lessen or eliminate water hammer when closing.

Diaphragm valves as disclosed herein frequently create a sudden closing action which results in water hammer. One reason for this water hammer is that the closure on the diaphragm contacts the rim of the seat entirely around it at the same time which creates a sudden cessation of flow through the valve.

The valve disclosed herein has a closure member on the diaphragm in the form of a seat washer made in such a way that in closing it moves down at an angle to the seat and contacts one edge of the seat first. As the diaphragm continues to close, it flexes at the opposite edge, and the result is a closing action wherein the closure on the diaphragm rocks relative to the seating surface. The valve seat could either be made at an angle to the diaphragm or the diaphragm seat washer could be wedge shaped in cross section. The wedge shaped diaphragm seat is the most convenient modification and tests have indicated that an angle of approximately five degrees is most effective for a one inch valve.

It is, accordingly, an object of the present invention to provide an improved valve.

Another object of the invention is to provide an improved diaphragm type valve.

Still another object of the invention is to provide a valve which is simple in construction, economical to manufacture, and simple and efficient to use and which will effectively reduce water hammer.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
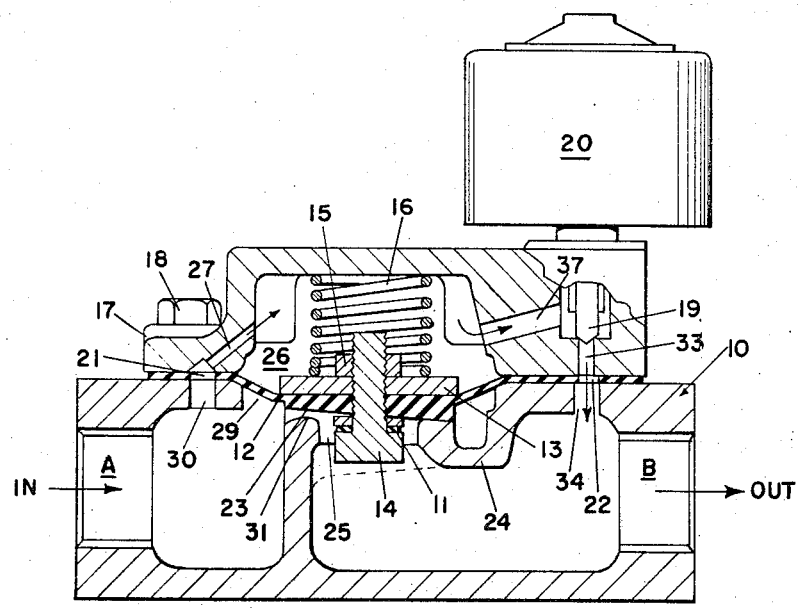
FIG. 1 is a longitudinal cross sectional view of a valve according to the invention.
Figure 2:
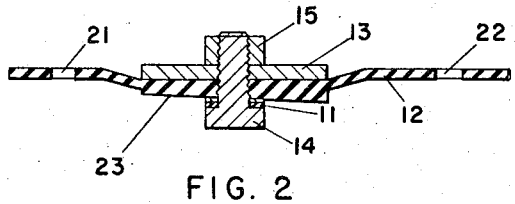
FIG. 2 is a sectional view showing the diaphragm removed from the valve.
Figure 3:
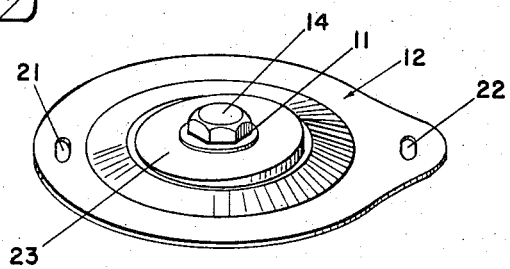
FIG. 3 is an isometric view of the diaphragm.

Now with more particular reference to the drawing, the valve shown in FIGS. 1, 2, and 3 has a body 10 which is hollow with an inlet A and an outlet B. The hollow body has a partition 24 therein which separates the inlet from the outlet and an opening 25 in the partition communicates between the inlet and the outlet.

A diaphragm 12 is supported over a lateral opening 29 in the valve body and a cap 17 is supported over the opening 29. The cap 17 sandwiches the outer peripheral edges of the diaphragm 12 between the cap and the body. The cap is held in place by bolts 18 which pass through spaced holes in the cap and threadably engage the body.

The cap has a concave inner surface that defines a control chamber 26 therein which is closed by the diaphragm 12. The pilot inlet channel is made up of a first channel 27 in the cap which is connected through a channel 30 in the body and a hole 21 in the diaphragm so that the inlet A is in fluid flow relation with the chamber 26.

A pilot outlet is formed by channel 37 which communicates through a channel 33 in the cap, a channel 34 in the body, and a hole 22 through the diaphragm so that the chamber 26 is connected in fluid flow relation with the outlet B.

A solenoid 20 is supported on the valve body and it has a plunger tip 19 which, in turn, has a conical point that, when closed, will close the channel 33, thereby stopping the flow of fluid from inside the chamber 26 to the outlet.

The diaphragm 12 has a wedge shaped seating member 23 integrally attached thereto and this wedge shaped seating member 23 has a control surface on it which engages the seating surface 31 on the partition surrounding the opening 25.

A disk-like metallic washer 13 rests on the diaphragm on the opposite side thereof from the wedge shaped seating member. A gasket 11 surrounds the screw 14 and underlies its head adjacent the point where the screw passes through the seating member 23. The screw 14 has a nut 15 thereon which holds the washer 13 and seating member rigidly together.

It will be seen that a plane passing through the control surface on the wedge shaped seating member 23 is disposed out of alignment with the plane passing through the seating surface 31 when the seat member is not in engagement with the seat. The diaphragm is urged toward the seating surface 31 by the spring 16 which is supported in the control chamber 26 and has one end thereof resting against the washer 13. Thus, when the solenoid plunger tip 19 is in the position shown, it will stop the flow of water through the opening 25. Therefore, water entering the pilot inlet channel 30, 21 and 27 will build up pressure in the chamber 26 and force the diaphragm down to bring the seating member 23 into engagement with the seating surface 31. This action is aided by the spring 16.

When it is desired to open the valve, the solenoid 20 is excited by a suitable electrical current, and it will lift the plunger tip 19 out of engagement with its seat which will allow water from chamber 26 to flow through the pilot outlet channel 37, 33, and 34. This will reduce the pressure in chamber 26 since the restricted pilot inlet channel will not allow the water to enter chamber 26 as fast as it escapes through the pilot outlet channel. Thus, the pressure below the diaphragm at the inlet A end will be greater than the pressure in chamber 26 and the diaphragm will lift the seating member 23 out of engagement with the seating surface 31.

When the plunger tip 19 is allowed to close the pilot outlet channel, the diaphragm will be forced downward by spring 16 and by liquid building up a pressure in chamber 26 which will cause the valve to close. The seating surface 31 will first engage one edge of the seating member 23, as indicated in FIG. 1, and the diaphragm will swing down to close the port in a gradual action.

Figure 4:
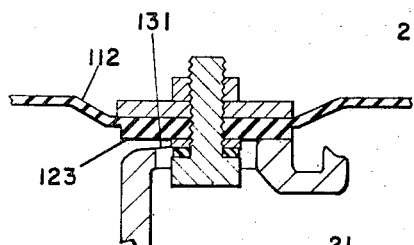
FIG. 4 is a partial longitudinal cross sectional view of another embodiment of the invention.

In the embodiment of the invention shown in FIG. 4, the seating surface 131 is disposed at an angle to the flat surface of seating member 123 on the diaphragm 112. Thus, the action of the diaphragm in FIG. 4 will be similar to that in FIG. 1, but in this case, the seat instead of the diaphragm has the inclined surface thereon.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

1. A valve comprising
a hollow body having an inlet and an outlet,
a partition in said hollow body between said inlet and said outlet,
said partition having an opening therein connecting said inlet to said outlet,
a diaphragm supported on said hollow body adjacent said opening,
means on said hollow body on the side of said diaphragm remote from said partition defining a control chamber for control of fluids,
pilot inlet channel means on said hollow body connecting said side of said hollow body on the side of said partition adjacent said inlet with said control chamber,
pilot outlet channel means on said hollow body connecting said control chamber with the inside of said hollow body on the side of said partition adjacent said outlet,
means for selectively opening and closing said pilot outlet channel,
and a control means on said diaphragm on the side thereof adjacent said opening in said partition adapted to engage a seating surface on said partition around said opening whereby said opening may be closed,
said control member comprises a relatively thick seating member, wedge-shaped in cross section, and a compression spring engaging said seating member urging said seating member toward closed position,
said control means when not in engagement with said seating surface being disposed in a plane at an angle to a plane passing through said seating surface whereby said control means contacts one edge of said seating surface first and then swings into seating engagement therewith.

References Cited
UNITED STATES PATENTS

| | | | |
|---|---|---|---|
| 2,664,916 | 1/1954 | Conley | 251—44 X |
| 2,907,340 | 10/1959 | Kenney | 251—45 X |
| 1,910,237 | 5/1933 | Cadwell | 137—198 |
| 2,069,069 | 1/1937 | Horton | 251—77 |
| 2,900,163 | 8/1959 | Nickells | 251—45 |
| 2,933,257 | 4/1960 | Clark | 251—46 |

FOREIGN PATENTS 6,451    1879    Germany.

M. CARY NELSON, *Primary Examiner.*